(12) United States Patent
Troy et al.

(10) Patent No.: US 8,138,938 B2
(45) Date of Patent: Mar. 20, 2012

(54) HAND-HELD POSITIONING INTERFACE FOR SPATIAL QUERY

(75) Inventors: James J. Troy, Issaquah, WA (US); Christopher Esposito, North Bend, WA (US)

(73) Assignee: The Boeing Company, Chicago, IL (US)

( * ) Notice: Subject to any disclaimer, the term of this patent is extended or adjusted under 35 U.S.C. 154(b) by 642 days.

(21) Appl. No.: 12/259,947

(22) Filed: Oct. 28, 2008

(65) Prior Publication Data

US 2010/0102980 A1   Apr. 29, 2010

(51) Int. Cl.
- G08B 21/00 (2006.01)
- B60Q 1/00 (2006.01)
- G01S 3/02 (2006.01)

(52) U.S. Cl. .................. 340/686.6; 340/686.1; 340/462; 342/450; 342/451

(58) Field of Classification Search .................. None
See application file for complete search history.

(56) References Cited

U.S. PATENT DOCUMENTS

| | | | | |
|---|---|---|---|---|
| 4,806,936 | A * | 2/1989 | Williams et al. | 342/126 |
| 5,150,310 | A * | 9/1992 | Greenspun et al. | 342/451 |
| 6,671,058 | B1 * | 12/2003 | Braunecker et al. | 356/616 |
| 7,145,647 | B2 * | 12/2006 | Suphellen et al. | 356/141.1 |
| 7,268,892 | B2 * | 9/2007 | Van Den Bossche | 356/601 |
| 2009/0086014 | A1 | 4/2009 | Lea et al. | |
| 2009/0086199 | A1 | 4/2009 | Troy et al. | |
| 2010/0225498 | A1 * | 9/2010 | Leuthardt et al. | 340/686.1 |

FOREIGN PATENT DOCUMENTS

| | | |
|---|---|---|
| EP | 1596218 | 11/2005 |
| EP | 1980820 | 10/2008 |
| WO | 99/60525 | 11/1999 |
| WO | 2005/059473 | 6/2005 |

OTHER PUBLICATIONS

Web page featuring HandSCAPE—MIT Tangible Media Group Projects http://tangible.media.mit.edu/projects/handscape/ (date of first publication unknown).

Web page featuring Leica Geosystems—Leica TPS1200+ The Total Station with the Plus www.leica-geosystems.com (date of first publication unknown).

Web page featuring Leica Geosystems—Leica DISTO™ A8 the visionary one—for in and outdoors www.leica-geosystems.com (date of first publication unknown).

Web page featuring Leica Geosystems—Leica RedLine—The World's most versatile Construction Site positioning range www.leica-geosystems.com (date of first publication unknown).

(Continued)

*Primary Examiner* — Julie Lieu
(74) *Attorney, Agent, or Firm* — Dennis Plank

(57) ABSTRACT

A system and method for determining the position and orientation of a handheld device relative to a known object is presented. The system comprises a handheld device having an inertial measurement unit and a sighting device, such as a laser pointer, that are used to determine the position of the handheld device relative to a target object, such as a structure, aircraft, or vehicle. The method comprises calibrating a handheld device to find the current location of the handheld device relative to a target object, tracking the movement of the handheld device using an inertial measurement unit, and presenting an updated position of the handheld device relative to a target object.

20 Claims, 6 Drawing Sheets

OTHER PUBLICATIONS

Web page featuring Leica Geosystems—Leica Builder T100/T200; R100/R200; R100M/R200M www.leica-geosystems.com (date of first publication unknown).

Web page featuring Leica Geosystems—Leica Dimensional Control Program—Application Software DCP www.leica-geosystems.com (date of first publication unknown).

Web page featuring ViconBlade, Vicon Motion Systems www.vicon.com (date of first publication unknown).

Web page featuring MotionAnalysis—The Industry Leader for 3D Passive Optical Motion Capture—Raptor-4 Digital RealTime System www.MotionAnalysis.com (date of first publication unknown).

Web page featuring ProCollector and ProCommander—a dynamic duo of laser power. www.SL-Laser.com (date of first publication unknown).

* cited by examiner

HAND-HELD POSITIONING INTERFACE FOR SPATIAL QUERY

FIELD

Embodiments of the subject matter described herein relate generally to a system and method for determining the position and orientation of a handheld device relative to a known object.

BACKGROUND

When working with large and complex systems, like commercial aircraft, personnel such as mechanics, technicians, and inspectors often need to access coordinate data at their current position, as well as position data for specific parts. Some available positioning systems allow an instrument to determine its position and orientation in relation to a known object. Many of these systems require substantial capital investment and are large enough that usually they require some type of grounded support.

Commercially available systems include video camera based systems, laser based systems, GPS based systems, and RFID triangulation based systems. Video camera based systems include multi-camera position and orientation capture systems, single camera pixel-based image systems, and single camera position and orientation software. Examples of laser based systems include interferometer based systems, electronic distance measurement laser-based systems, surveying and construction equipment laser systems. GPS and differential GPS based systems receive signals from orbiting GPS satellites and therefore work best outdoors where there is a clear line of sight to the orbiting GPS satellites. RFID based systems triangulate their position from signals received from multiple transmitters that are set up around the perimeter of the work area.

SUMMARY

Presented herein is a low cost system and method for determining the position and orientation of a device relative to a known object without requiring the use of off-board tracking components. In various embodiments, the system and method includes or utilizes orientation sensors in conjunction with a locating process to determine the position of the device relative to the local coordinates of a known object. In one embodiment, once an initial position of the device is determined, an inertial measurement unit (IMU) in the device tracks movements of the device to determine an updated position of the device relative to the local coordinates of a known object. In another embodiment, the system and method provides a 1:1 mapping of real-world motion to motion in a 3D virtual environment.

In one embodiment, the locating process comprises: (a) calibrating the initial position of a handheld device to determine the location of the handheld device relative to the known object, (b) aligning the orientation of one or more axis of the handheld device to the known object, and (c) using sensors in the handheld device as an inertial measurement unit (IMU) to measure relative position changes between the calibrated initial position and the current position as the handheld device is moved in relation to the known object. In one embodiment, the current position and orientation of the handheld device is used to display relevant information on the handheld device about a portion of the known object, for example the portion of the known object at which the handheld device is pointed. In another embodiment, the handheld device uses the current position and orientation of the handheld device to guide the user to a specific location of the known object.

In one embodiment, the calibrating process comprises: (a) pointing the handheld device at a feature of the known object or features having known local coordinates on the known object, (b) sensing the orientation of the handheld device while pointed at the feature, (c) pointing the handheld device at additional features of the known object and sensing the orientations of the device while pointed at the additional features, and (d) performing calculations using the sensor orientations and the local coordinates of the features to determine the initial position of the handheld device relative to the known object. In another embodiment, sensors in the handheld device measure relative position translations and relative motion during the calibration process. In another embodiment, the orientation sensors are used to determine the orientation of the handheld device relative to the known object.

The features, functions, and advantages discussed can be achieved independently in various embodiments of the present invention or may be combined in yet other embodiments further details of which can be seen with reference to the following description and drawings.

BRIEF DESCRIPTION OF THE DRAWINGS

The accompanying figures depict various embodiments of the hand-held positioning interface for spatial query. A brief description of each figure is provided below. Elements with the same reference number in each figure indicate identical or functionally similar elements. Additionally, the left-most digit(s) of a reference number indicate the drawing in which the reference number first appears.

DETAILED DESCRIPTION

Figure 1:
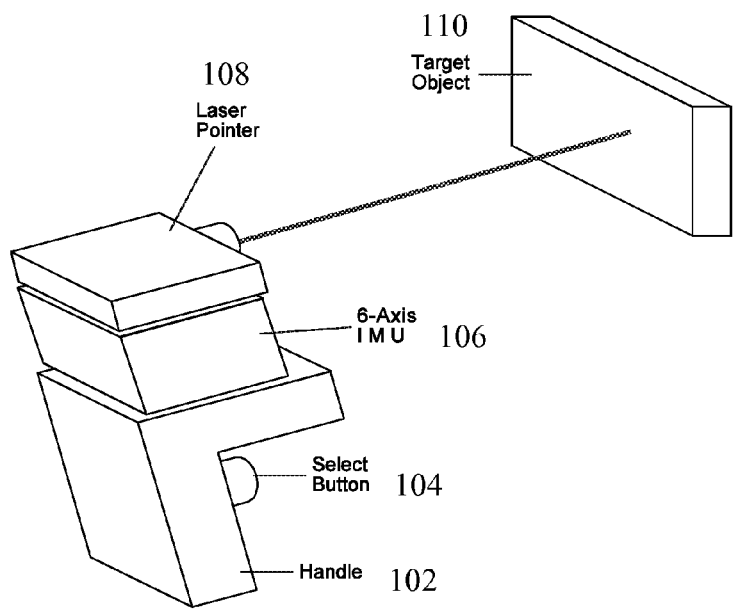
FIG. 1 is a schematic, perspective view of an illustrative embodiment of a handheld positioning device comprising an inertial measurement unit (IMU) device used to determine relative position and orientation.

The following detailed description is merely illustrative in nature and is not intended to limit the embodiments of the invention or the application and uses of such embodiments. Furthermore, there is no intention to be bound in the claims by any expressed or implied theory presented in the preceding field, background, summary, brief description of the drawings, or the following detailed description.

The following description refers to elements or nodes or features being "connected" or "coupled" together. As used herein, unless expressly stated otherwise, "connected" means that one element, node, or feature is directly joined to (or directly communicates with) another element, node, or feature, and not necessarily mechanically. Likewise, unless expressly stated otherwise, "coupled" means that one element, node, or feature is directly or indirectly joined to (or directly or indirectly communicates with) another element/node/feature, and not necessarily mechanically. Similarly, unless expressly stated otherwise, "in communication" means that one element, node, or feature is directly or indirectly joined to (or directly or indirectly communicates with) another element/node/feature, and not necessarily mechanically. Thus, although the figures depict one possible arrangement of elements, additional intervening elements, devices, features, or components may be present in an embodiment of the depicted subject matter without departing from the scope of the present disclosure.

Various technical terms used in this disclosure are defined as follows. Coordinate system refers to a frame of reference defined by three orthogonal directions (X, Y, Z); coordinate systems can be attached to moving and stationary objects. Cartesian coordinates refers to a rectangular (orthogonal) coordinate system. Local coordinates refers to a coordinate system associated with a specific object. Direction vector refers to a 3-dimensional measurement from an end position to an origin position described in terms of its X, Y, and Z components. Translation refers to linear or curvilinear motions that do not change the orientation of an object. Rotation refers to angular motions that change the orientation of the object without translating the object. Position refers specifically to the X, Y, and Z measurements of a point defined in a specific coordinate system. Orientation refers specifically to the measurement of the rotation of one coordinate system relative to another coordinate system. Rotation matrix refers to a 3×3 orthogonal matrix that describes the orientation of one coordinate system to another. Transformation matrix refers to a 4×4 homogeneous matrix that describes the relative position and orientation of one coordinate system to another (sometimes referred to as a transformation or matrix). Absolute motion refers to movement relative to a world coordinate system. Relative motion refers to movement of one coordinate system relative to another (sometimes referred to as local motion). Vector operations refers to direction vectors defined in the same coordinate system that can be added or subtracted, or multiplied by a rotation matrix to transform them from one coordinate system to another.

A. Hand-Held Positioning Devices for Spatial Query

A schematic view of one embodiment of a hand-held positioning device for spatial query shown in FIG. 1 is an IMU-based device 100. The IMU-based device 100 comprises a handle 102 for gripping the IMU-based device 100, a select button 104 positioned on or integrated into the handle 102, a 6-axis inertial measuring unit (six-axis IMU 106), coupled to the top of the handle 102, and a laser pointer 108 coupled to the six-axis IMU 106. The IMU-based device 100 is held by a user (not shown) such that the laser pointer 108 points towards a target object 110.

In operation, a user points the IMU-based device 100 at a target object 110 and actuates the select button 104, and the IMU-based device 100 records the current state of the six-axis IMU 106. The six-axis IMU 106 provides the sensing components for a full 6-DOF inertial navigation system (INS). An INS is capable of continuous 6 degree-of-freedom (DOF) measurement, which includes 3-DOF for position and 3-DOF for orientation. The six-axis IMU 106 has accelerometers and gyros for measurement of linear acceleration and angular velocity measurement, respectively. The data provided by the accelerometers and gyros, along with time measurements, is then numerically integrated to provide position and orientation data. A simple sighting device, in this embodiment a laser pointer 108, assists the user in pointing the IMU-based device 100 at a desired location on the target object 110. In alternate embodiments, the pointing means can be a mechanical means, for example a physical feature of the IMU-based device 100 itself, such as an edge, that is sight-aligned with the desired location on the target object 110, a light emitting means such as a projected light, a laser, an optical means such as a boresight affixed to the IMU-based device 100, or a digital camera, for example with an accompanying screen or display for showing the picture from the direction pointed to by the digital camera.

Figure 2:
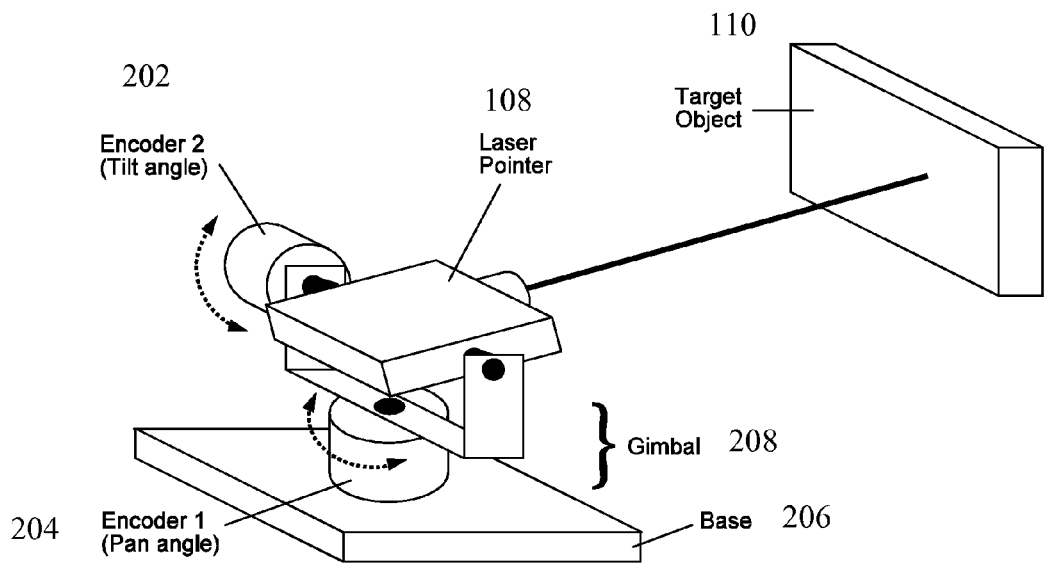
FIG. 2 is a schematic, perspective view of an illustrative embodiment of a mounted positioning device comprising a multi-axis gimbal with rotational sensors capable of measuring direction vector angles.

In another embodiment, illustrated in FIG. 2, a gimbal-based device 200 is used to measure the angular orientation of the gimbal-based device 200. The gimbal-based device 200 comprises a multi-axis gimbal 208 with a tilt angle sensor 202 for measuring the tilt angle of the laser pointer 108 relative to the base 206, and a pan angle sensor 204 for measuring the pan angle of the laser pointer 108 relative to the base 206. Together, the tilt and pan angle sensors 202, 204 provide a high precision measurement of the angular orientation of the laser pointer 108 of the gimbal-based device 200. These tilt and pan angle sensors 202, 204 may include, but are not limited to, rotary encoders or rotary potentiometers. The rotary tilt and pan angle sensors 202, 204 measure relative angles and usually provide more accurate angle measurement than a gyro-based six-axis IMU 106, but a potential downside of the gimbal-based device 200 is that additional position translation can not be accommodated with this particular configuration, since measurement of relative translations from the initial position is not available solely from the tilt and pan angle sensors 202, 204.

Figure 3:
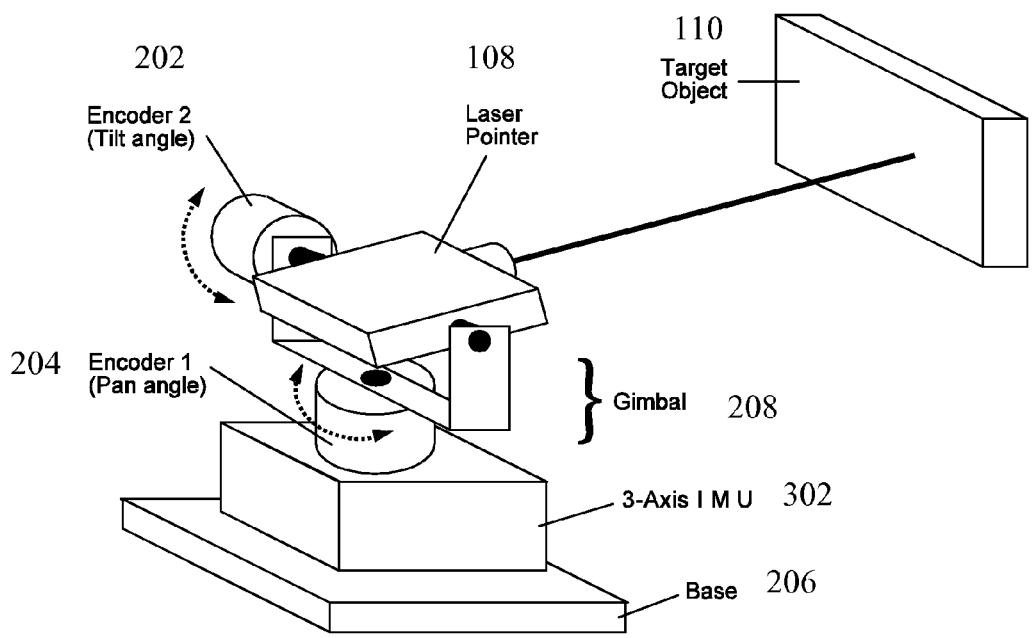
FIG. 3 is a schematic, perspective view of an illustrative embodiment of a mounted positioning device comprising an angle measurement gimbal and a 3-axis IMU.

Another embodiment, illustrated in FIG. 3, is a hybrid system 300. The hybrid system 300 comprises the gimbal-based orientation measurement components of the gimbal-based device 200 in FIG. 1 combined with a 3-axis linear accelerometer unit 302 similar to the six-axis IMU 106 in the IMU-based device 100 of FIG. 1. The hybrid system 300 provides high precision angle measurements while facilitating measurement of position changes.

Figure 4:
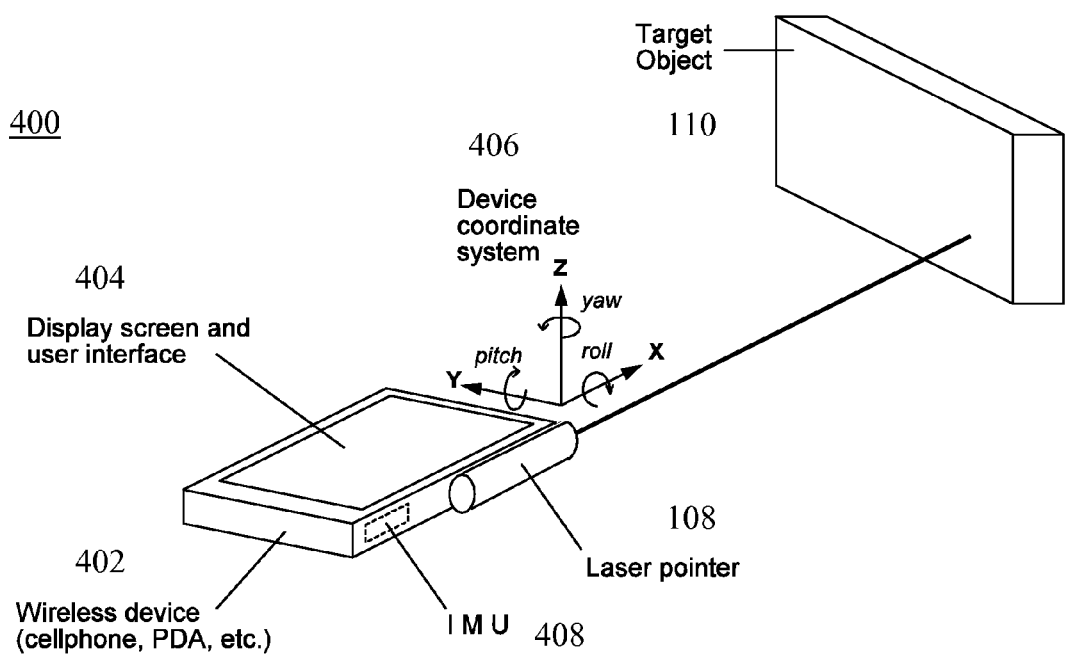
FIG. 4 is a schematic, perspective view of an illustrative embodiment of a hand-held wireless device with attached laser pointer.

Another embodiment, illustrated in FIG. 4, is an adapted communications device 400. The adapted communications device 400 comprises a communications device 402 having a wireless or wired data connection and loaded with a software package for running a position determining application. A display screen 404 provides a user interface and the selection trigger. The communications device 402 can take the form of a cellphone, PDA, or similar wireless or wired device capable with a specified device coordinate system 406 and inertial-based measurement sensors 408. Some current generation cell phones have integrated, general-purpose accelerometers (for example, the Apple® iPhone®), and future devices may also contain angular rate gyros, that make up the sensing components of an inertial measurement unit, or IMU, having multiple degrees of freedom. This is shown as the inertial-based measurement sensors 408 embedded in communications device 400.

In other embodiments, other types of accelerometer-gyro units may be externally coupled to communications device 400. For example, the IMU-based device 100, the gimbal-based device 200, or the hybrid device 300 could be communicatively coupled to communications device 400 to provide position and orientation. With the proper numerical integration software, these general-purpose MEMS-based accelerometers and/or gyroscopes components can be used as the sensors for an inertial navigation system (INS) that functions similarly to dedicated IMU-based systems to measure position and rotation changes.

The communications device 400 is shown with a laser pointer 108 used for sighting the target object 110. In alternative embodiments, a sighting scope, camera, video camera, or physical attributes of the communications device 400 itself can be used for sighting the target object 110. In those alternative embodiments, a crosshair or alignment markings (not shown) may facilitate proper sighting of the target object 110.

Figure 5:
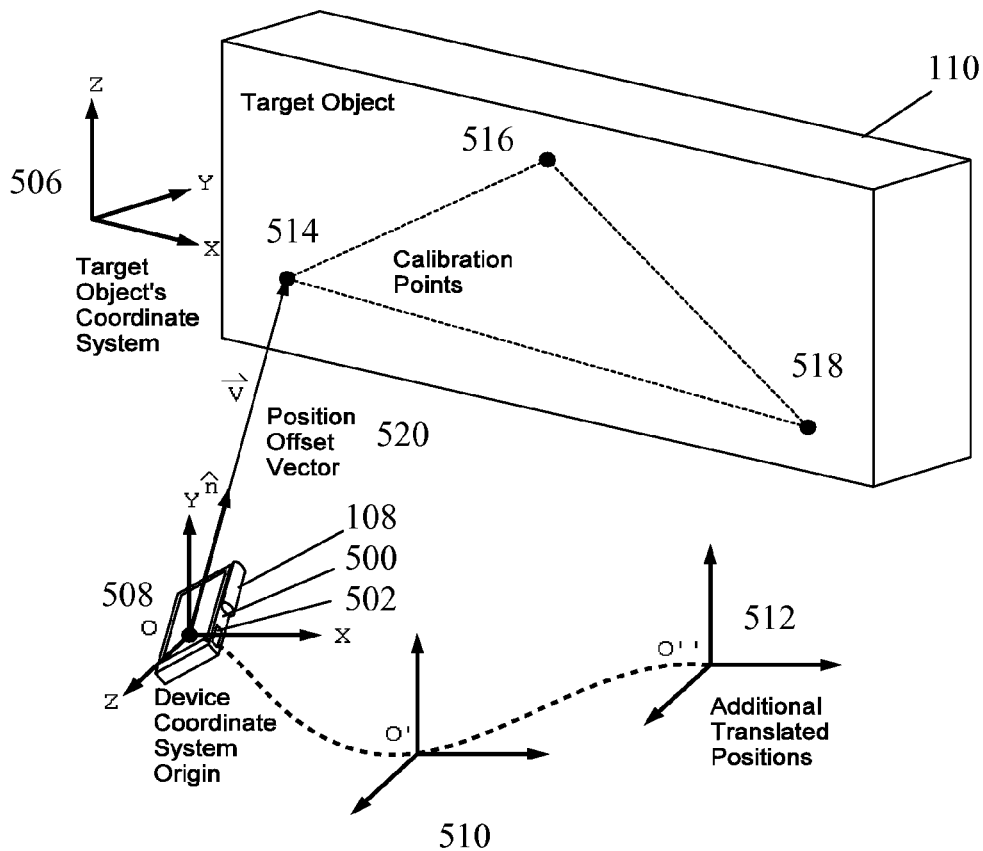
FIG. 5 is a diagram of an illustrative embodiment of a target object local coordinate system, a handheld device local coordinate system, calibration points on the target object, and relative translation movement of the device.

Referring now to FIG. 5, one embodiment of a handheld device 500 comprises an IMU 502 and a laser pointer 108 as a simple sighting device. For purposes of illustration only, the system and method will be described using an airplane as the target object 110, even though the system and method are applicable to nearly any target object 110 such as a structure, vehicle, object, or the like. The handheld device 500 determines the current position and orientation of the handheld device 500 in the local target coordinate system 506 of the target object 110, in this example an airplane. Knowing the exact position and orientation of the handheld device 500 allows a user to retrieve information about parts and features of the airplane from a database that is stored in the local target coordinate system 506 of the airplane and facilitates construction, quality control, and maintenance functions to be performed to the airplane. This information may include, but is not limited to, numerical data, CAD/3D models, and images.

In various embodiments, this information regarding the airplane is displayed to the user on the handheld device 500. For example, information regarding parts both visible to the user and occluded from the view of the user, for example hidden behind a panel, can be displayed on the handheld device 500. In another embodiment, the handheld device 500 determines the current position and orientation of the handheld device in the local coordinate system 506 of the airplane and presents instructions on the handheld device 500 to guide a user to the location of a desired feature, part, or position on the aircraft. In another embodiment, real-time position and orientation data measured by the device 500 are used to move virtual objects or provide a virtual viewpoint in a 3D virtual environment or CAD application. In one embodiment, these applications run locally on the handheld device 500; in another embodiment the handheld device supplies position and orientation information to a computer system (not shown) in communication with the handheld device 500. In yet another embodiment, the position and orientation data from the handheld device 500 is used to communicate data to a diagnostic system for the target object 110, for example a vehicle, to provide a display of real-time feedback of the diagnostic system's state, such as voltage, RPM, pressure, temperature, etc. In yet another embodiment, the device 500 uses the position and orientation data in communication with on-board system of a target object 110 to select controllable components and set adjustable parameters of the component.

B. Setup and Operation Overview

Continuing to refer to FIG. 5, a locating process determines the initial position of the handheld device 500 relative to the target object. The locating process calibrates the handheld device 500 and finds the current location of the handheld device 500 relative to the airplane or target object 110. The handheld device 500 localization process used in this disclosure depends on determining direction vectors V from the handheld device 500 to known positions or calibration point 514, 516, 518 on a target object 110, which are determined by using measurements of the handheld device's 500 relative orientation. Once calibrated in this way, the user then moves the handheld device 500 and the IMU 502 tracks the relative positional changes between the calibration position 508 and additional translated positions 510, 512. The localization process, which will be described in more detail later in this disclosure, provides the relative position offset between the target object 110 and the handheld device 500.

In some embodiments, the orientation of the handheld device 500 relative to the target object 110 in not required during use, for example if only relative position data is required. In other embodiments, the handheld device 500 also provides orientation data relative to the target object 110. An orientation process aligns the handheld device 500 relative to the target object 110. When the orientation of the handheld device 500 relative to the target object 110 is required, it can be determined in several different ways. For situations in which small movements from the original calibration point 508 are needed, it may be satisfactory to visually align the handheld device 500 with the axis of the airplane or target object 110. If more accurate tracking is needed for positions further away from the calibration point 508, the user can align the handheld device 500 with some known structure or marking on the airplane or target object 110 (for example a floor beam or stencil). For more general purpose determination of the relative orientation, a vector-based approach can be used, which will also be described later. If only the original calibration position 508 is needed, then orienting and translating need not be performed.

Once the starting position 508 and orientation of the handheld device 500 have been established, the Cartesian position of the handheld device 500 relative to the starting point 508 can be updated in real-time as the user moves through or around the airplane or target object 110. For systems with full IMU 502 capabilities, the position offsets are continuously measured by the positional measurement sensors and added to initial position 508; this is shown by the dashed line and additional points of interest or additional translated positions 510, 512 marked O' and O" in FIG. 5.

C. Initial Position Calibration Process in Detail

Continuing to refer to FIG. 5, the initial position calibration process uses the orientation sensors (e.g., 3-axis gyros or the gimbal device rotary tilt and pan angle sensors 202, 204 shown in FIGS. 2 and 3) of the IMU 502 to measure the relative direction vectors from the calibration position 508 to three known positions or three calibration targets 514, 516, 518 on the aircraft 110. The selection of the three calibration targets 514, 516, 518 are chosen so that there is a clear line of sight from the handheld device 500, and so that the three calibration targets 514, 516, 518 are not co-linear. In one embodiment, the sighting device is a laser pointer 108. In alternate embodiments, any visual alignment means such as a simple boresite or telescope would work. The laser pointer 108 is rigidly connected to the IMU 502, as shown in FIGS. 1 through 5, such that the laser pointer 108 and IMU 502 move together.

Figure 6:
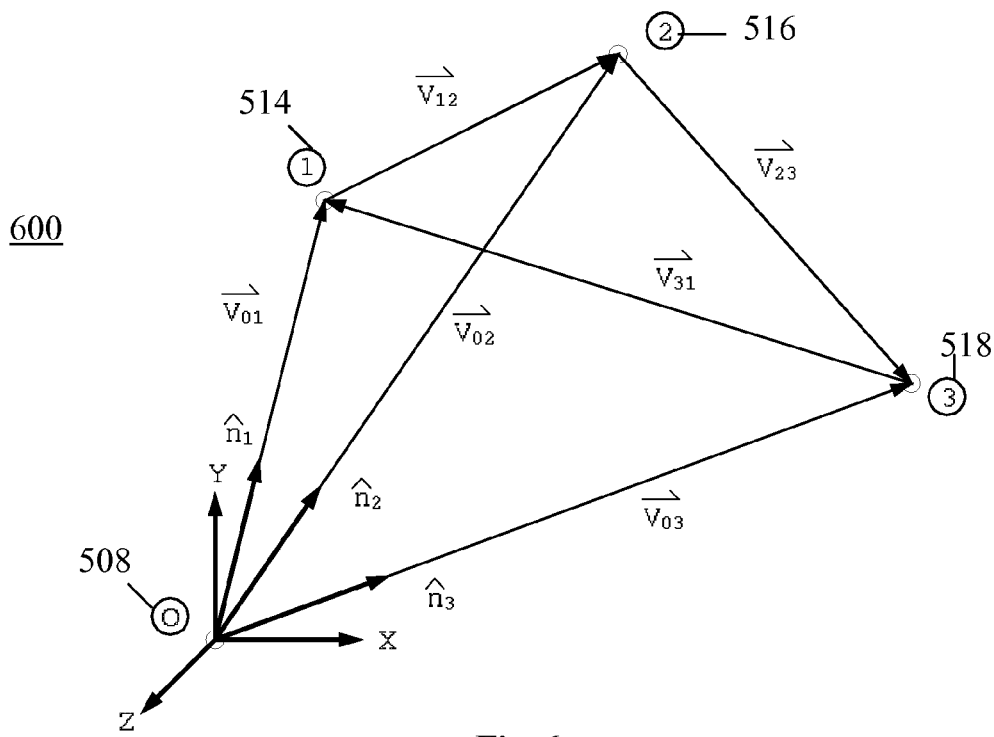
FIG. 6 is a diagram of an illustrative embodiment of a vector diagram having vectors used for calculating an initial device location.

Referring now to FIG. 6, the calibration process 600 involves solving a system of three simultaneous linear equations defined by three vector loop equations. FIG. 6 shows the unknown location of the handheld device 500 (not shown) that will become the calibration position 508, and the location of three known calibration points 514, 516, 518 on the target object 110. In this configuration, the vectors $V_{12}$, $V_{23}$, and $V_{31}$ on the target object 110 are known, as are unit vectors $n_1$, $n_2$, and $n_3$, whose directions have been measured by the IMU 502, but the magnitudes of those vectors ($d_1$, $d_2$, and $d_3$) are not known.

The derivation of the solution begins by defining three unique vector loop equations, shown in Eqn 1. The unknown vectors $V_{01}$, $V_{02}$, and $V_{03}$ are related to the unit vectors $n_1$, $n_2$, and $n_3$ through a scalar multiplication by the unknown magnitudes $d_1$, $d_2$, and $d_3$, as shown in Eqn 2. The goal is to solve for $d_1$, $d_2$, and $d_3$ and therefore find $V_{01}$, $V_{02}$, and $V_{03}$.

$$\vec{V}_{01} - \vec{V}_{02} + \vec{V}_{12} = 0$$

$$\vec{V}_{02} - \vec{V}_{03} + \vec{V}_{23} = 0$$

$$\vec{V}_{03} - \vec{V}_{01} + \vec{V}_{31} = 0 \quad \text{Eqn 1.}$$

$$\vec{V}_{01} = d_1 \hat{n}_1$$

$$\vec{V}_{02} = d_2 \hat{n}_2$$

$$\vec{V}_{03} = d_3 \hat{n}_3 \quad \text{Eqn 2.}$$

After substitution there are three sets of three equations, shown in Eqns 3-5.

$$d_1 n_{1x} - d_2 n_{2x} + V_{12x} = 0$$
$$d_1 n_{1y} - d_2 n_{2y} + V_{12y} = 0$$
$$d_1 n_{1z} - d_2 n_{2z} + V_{12z} = 0 \quad \text{Eqn. 3.}$$

$$d_2 n_{2x} - d_3 n_{3x} + V_{23x} = 0$$
$$d_2 n_{2y} - d_3 n_{3y} + V_{23y} = 0$$
$$d_2 n_{2z} - d_3 n_{3z} + V_{23z} = 0 \quad \text{Eqn 4.}$$

$$d_3 n_{3x} - d_1 n_{1x} + V_{31x} = 0$$
$$d_3 n_{3y} - d_1 n_{1y} + V_{31y} = 0$$
$$d_3 n_{3z} - d_1 n_{1z} + V_{31z} = 0 \quad \text{Eqn 5.}$$

From these, one equation is selected from each to create a non-singular set of equations and arranged into matrix form: $M\vec{A} = \vec{B}$, as shown in Eqn 6.

$$\begin{bmatrix} n_{1x} & -n_{2x} & 0 \\ 0 & n_{2y} & -n_{3y} \\ -n_{1z} & 0 & n_{3z} \end{bmatrix} \begin{bmatrix} d_1 \\ d_2 \\ d_3 \end{bmatrix} = \begin{bmatrix} -V_{12x} \\ -V_{23y} \\ -V_{31z} \end{bmatrix}. \quad \text{Eqn 6}$$

The unknowns in column vector A are solved for by inverting M, and pre-multiplying both sides, resulting in: $\vec{A} = M^{-1} \vec{B}$. The values for A, which are $d_1$, $d_2$, and $d_3$, are then plugged into Eqn 2 to give the relative offset of the target object 110 to the handheld device 500.

This formulation applies to both gyro-based angle measurement devices (e.g., an IMU-based device 100, a hybrid device 300, and an adapted communications device 400) and gimbal-based devices 200. Also note that because only the relative pan and tilt angles of the handheld device 500 are required for the calculations (i.e., without the roll angle), in some embodiments the IMU 502 only provides pan and tilt angle measurements (i.e., only has two degrees-of-freedom.)

When measuring the initial direction vectors, the method used to compute the handheld device 500 position assumes a common intersection point for the three direction vectors, but since device 500 is intended to be hand-held, the origins of the three vectors may not intersect at a common location. During typical usage there will usually be small to moderate position offsets due to motions of the user which would cause inaccuracies in the local position computation. To adjust for these motions, the 3-axis accelerometer or IMU 502 data can be used at the time of the initial direction vector acquisition to measure relative translations between the three vector origins, $O_1$, $O_2$, and $O_3$.

One option is to calculate the equivalent center of rotation by finding the average location of the points where the minimum distance between the direction vectors occurs. This relative offset will then be subtracted from the result of the calibration computation. Note that this is an approximate solution.

Figure 7:
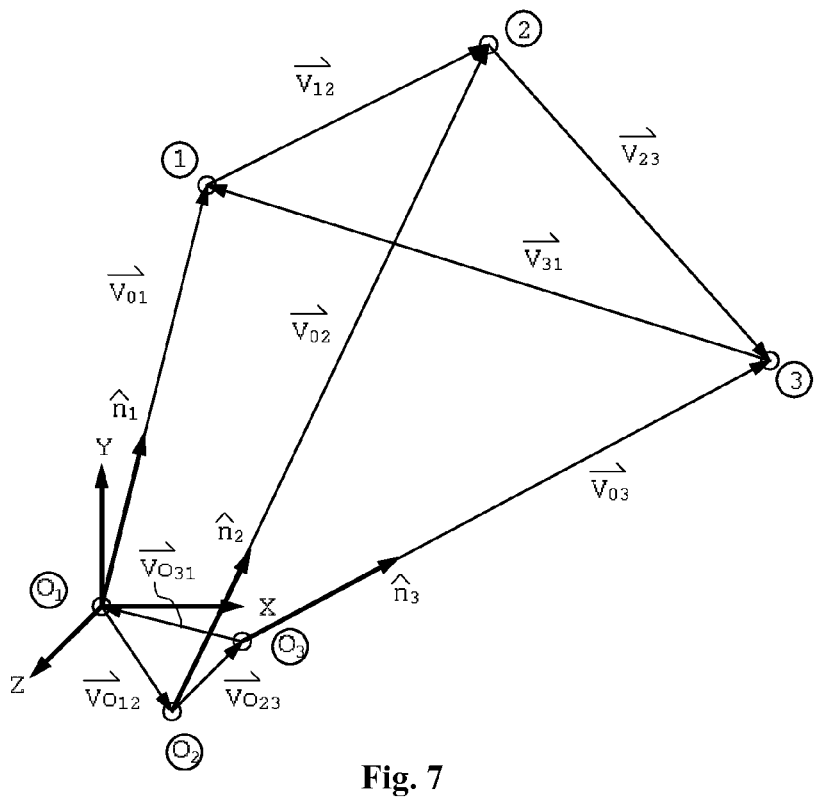
FIG. 7 is a diagram of an illustrative embodiment of a vector diagram having vectors used for calculating an initial device location when the origin points are non-aligned.

A more accurate solution is a three point calibration method 700 and involves solving the vector loop equations for a slightly different system configuration. Referring now to FIG. 7, the origin $O_1$, $O_2$, and $O_3$ of each vector is in a different location, but the number of unknowns is the same, since the origins $O_1$, $O_2$, and $O_3$ are offset by known amounts (from data measured by the accelerometers in the IMU 502). In the equations, this results in an additional known value included in the B vector of Eqn 6. From there, the solution process is the same as described for the system where the origins $O_1$, $O_2$, and $O_3$ intersect.

Figure 8:
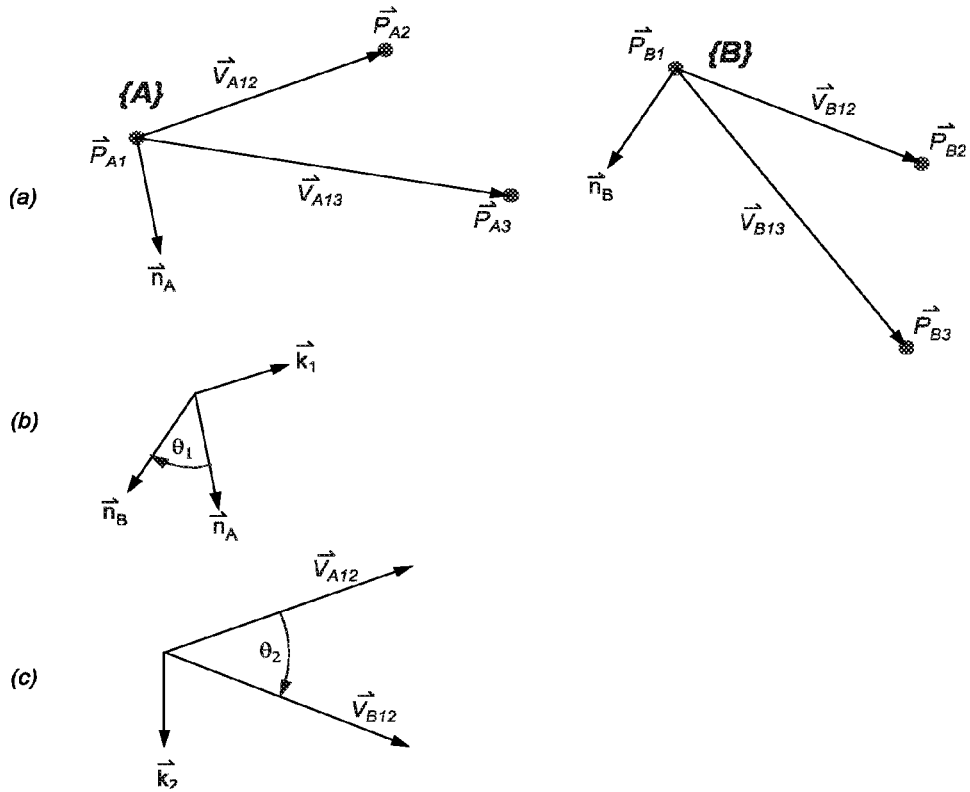
FIG. 8 is a diagram of an illustrative embodiment of vector diagrams for a 3-point calibration process for determining the relative orientation of the device coordinate system.

In another embodiment of a three point calibration method in which distance along the aim point vector is not measured directly, the orientation can be derived in a second step using the position solution determined in the initial relative positioning process. For this reconstructed orientation process 800, the relative position is used to generate direction vectors of the proper length from the three unit vectors measured by the handheld device. This allows the target points to be reconstructed in the handheld device's coordinate system, which are labeled: $P_{A1}$, $P_{A2}$, and $P_{A3}$, in the vector diagrams of FIG. 8. From this, the relative orientation between the coordinate systems can be determined using the process described below:

$$\vec{n}_A = \vec{V}_{A12} \times \vec{V}_{A13}$$

$$\vec{n}_B = \vec{V}_{B12} \times \vec{V}_{B13}$$

$$\vec{k}_1 = \vec{n}_A \times \vec{n}_B$$

$$\theta_1 = \cos(|\vec{n}_A| \cdot |\vec{n}_B|)^{-1}$$

$$R_1 = f_1(|\vec{k}_1|, \theta_1)$$

$$\vec{k}_2 = \vec{V}_{A12} \times \vec{V}_{B12}$$

$$\theta_2 = \cos(|\vec{V}_{A12}| \cdot |\vec{V}_{B12}|)^{-1}$$

$$R_2 = \eta_1(|\vec{k}_2|, \theta_2)$$

$$R_{12} = R_1 R_2$$

In the formulation above:

$\vec{V}_{A12}$ is the vector in coordinate system A created from points $\vec{P}_{A1}$ and $\vec{P}_{A2}$ (i.e., $\vec{V}_{A12}=\vec{P}_{A2}-\vec{P}_{A1}$).

Vectors $\vec{V}_{A13}, \vec{V}_{B12}, \vec{V}_{B13}$ follow the same format.

$\vec{n}_A$ and $\vec{n}_B$ are the vector normals created from the vector cross products $\vec{k}_1$ and $\vec{k}_2$ are axes of rotation $\theta_1$ and $\theta_2$ are rotation angles about axes $\vec{k}_1$ and $\vec{k}_2$, respectively $R_1$, $R_2$, and $R_{12}$ are 3×3 symmetric rotation matrices, and $f_1(\,)$ is the function which generates a 3×3 rotation matrix from the angle-axis definition described below (as shown in "Introduction to Robotics; Mechanics and Control", 3rd ed. by John J. Craig, published by Prentice Hall in 2004):

$$f_1(\hat{k}, \theta) = \begin{bmatrix} k_x k_x v\theta + c\theta & k_x k_y v\theta - k_z s\theta & k_x k_z v\theta + k_y s\theta \\ k_x k_y v\theta + k_z s\theta & k_y k_y v\theta + c\theta & k_y k_z v\theta - k_x s\theta \\ k_x k_z v\theta - k_y s\theta & k_y k_z v\theta + k_x s\theta & k_z k_z v\theta + c\theta \end{bmatrix}$$

Where $c\theta = \cos(\theta)$, $s\theta = \sin(\theta)$, $v\theta = 1 - \cos(\theta)$, and $\hat{k} = [k_x, k_y, k_z]$ D. Operation The IMU 502 measures the rate of change in angle (from three gyros) and the linear acceleration (from three accelerometers). The raw data from the gyros is integrated once to produce the angles, and the data from the accelerometers is integrated twice to produce position, as shown in Eqns 7 and 8.

$$\vec{v} = \vec{v}_0 + a(\Delta t) \qquad \text{Eqn 7.}$$

$$\vec{p} = \vec{p}_0 + \vec{v}_0(\Delta t) + 0.5 a(\Delta t)^2 \qquad \text{Eqn 8.}$$

The acceleration data must be transformed into a stationary coordinate system by pre-multiplication of a rotation matrix created from the gyro data before it can be used for this task. The data may also be filtered to reduce noise. IMUs 502, such as the six-axis IMU 106, tend to drift in both position and orientation, which means that re-calibration of the handheld device 500 to the target object will be necessary after some time. These IMU 502 issues are common to inertial navigation systems of this type, not specific to this invention disclosure but have been included here for completeness. In other embodiments, applications running on, or in communication with, the handheld device 500 use the acceleration and/or velocity data for additional purposes and tasks.

Rotary sensors in a 2-axis gimbal 208 move measure relative to the base in pan ($\theta_1$) and tilt ($\theta_2$) angle, which can be converted into the direction vectors described earlier by using Equation 9.

$$d = |[\cos(\Theta_1)\cos(\Theta_2), \sin(\Theta_1)\cos(\Theta_2), \sin(\Theta_2)]| \qquad \text{Eqn 9.}$$

For some applications it may be useful to have the laser beam emanate from the handheld device 500 in a different direction, for example along the y-axis or negative z-axis of the handheld device 500. In these types of embodiments, redirection of the beam can be accomplished by physically mounting the laser pointer 108 in a new fixed position, or by using a beam splitter or mirror placed in the path of the laser beam from the laser pointer 108.

In some applications is may be useful to trace a shape while continuously recording the path, for example a wire, tube, or edge. In one such embodiment, a physical guide (not shown) of known dimensions is attached to the handheld device 500 (for example, an extension with a hook) that allows the user to easily constrain motion to follow the path along the target 110 as the user moves the handheld device 500.

Figure 9:
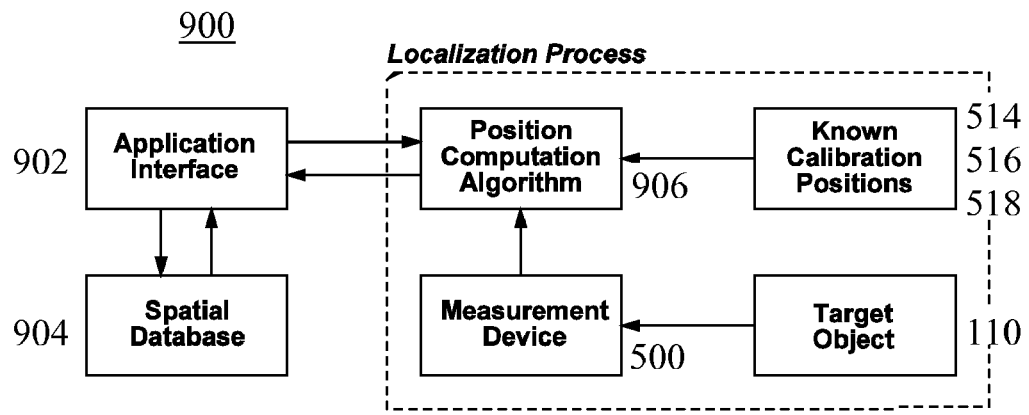
FIG. 9 is a flowchart of an illustrative embodiment of a 3D localization process in a part of a location-based application.
Figure 10:
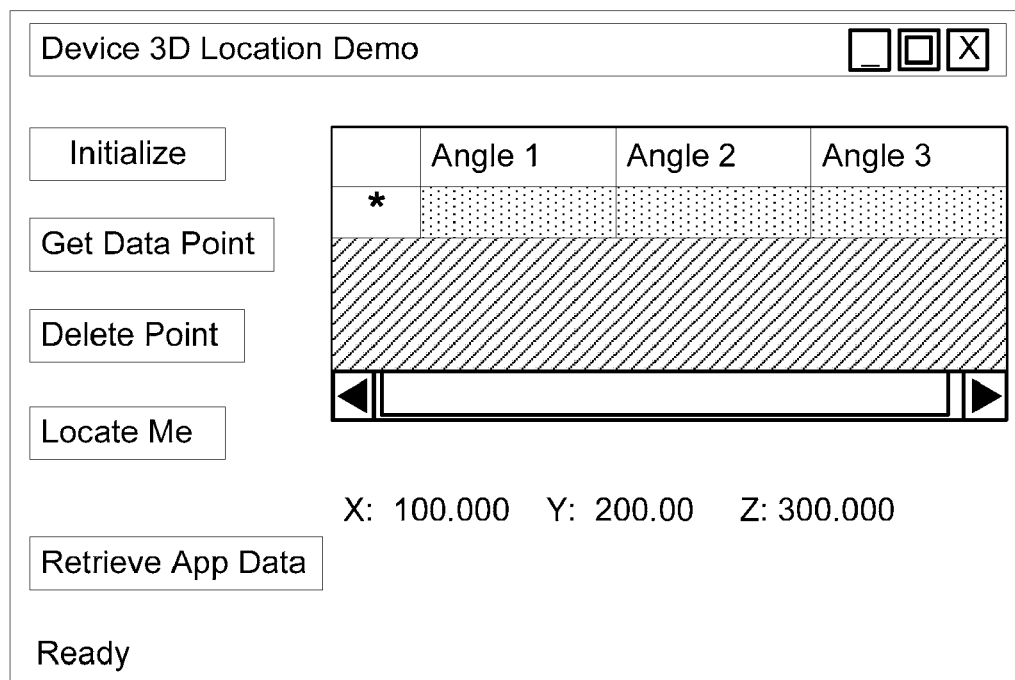
FIG. 10 is a screen capture of an illustrative embodiment of a computer interface for a 3D localization application.

Referring now to FIG. 9, one embodiment of a system comprises the localization process 900, a user interface 902, and infrastructure to communicate with an application that uses location data (e.g., a 3D database or visualization server). In this application, the user needs local position data in order to extract a location specific result from a spatial database 904. The localization sub-system 900 comprises a 3-DOF orientation sensor or a 6-DOF inertial measurement device (e.g., IMU 502), a pointing device (e.g, laser pointer 108), and position calculation software 906. Referring to FIG. 10, one embodiment of the user application interface 902 is illustrated.

E. Advantages and Applications

The handheld device 500 utilizes an IMU 502 to track position, allowing the handheld device 500 to be used indoors or other places where GPS coverage is poor or unavailable. The IMU 502 in or attached to the handheld device 500 is self-contained, eliminating the need to first put additional infrastructure in place prior to using a positioning system, for example the perimeter of transmitters/receivers commonly used to enable RFID based positioning systems. The IMU 502 also provides positioning data faster than either GPS or RFID, allowing for much finer granularity of movement. The IMU 502 further eliminates the possibility of transmitter-to-receiver errors that are possible with GPS and RFID based systems, such as low signal strength, signal outages, local signal blocking, multipath errors, and other potential signal path distortions. Signal path distortions can be exacerbated by the presence of large quantities of metal, such as those found in airplanes, in ways that can be hard to predict and difficult to compensate for. The IMU 502 improves position accuracy and reliability because it does not rely on external signals that can be lost or distorted. Further, the handheld device 500 can generally be produced at a lower price point because it does not require this ancillary equipment.

In some embodiments, the handheld device 500 is configured in a form factor that is small and light enough to be held and, in some embodiments, used with one hand. The handheld device is available for immediate use once power is turned on. A simple calibration procedure reduces the setup time compared with many current commercially available positioning systems. This simple and fast calibration allows mechanics, technicians, inspectors, and others to use the handheld device 500 for everyday applications where the use of more complex or expensive positioning systems might not be justifiable.

The cost and ease of use of the handheld device 500 allows it to be used in any number of alternative applications. For example, tourists equipped with the handheld device 500 could navigate around museums and historical sites on self-guided tours, allowing them to point at specific points of interest and retrieve related information about the item being pointed at. Visitors to campuses or facilities can use the handheld device 500 to receive directions, even indoors where it might be difficult to receive GPS signals and impractical to set up RFID transmitters/receivers. The database that the handheld device 500 accesses can describe a virtual object, for example an airplane under construction. Therefore, when partnered with a video display, the handheld device 500 can be used during factory tours or trade shows to present virtual tours to potential customers.

In an alternative embodiment, the handheld device 500 can be set to a specified position directly, without taking measurements or performing the calibration procedure. For example, the handheld device's 500 position and orientation can be manually or automatically entered using fixed index marks in the target object's 110 environment, for example from previous device's calibrations or by using landmarks with known position and orientation. This allows users to return the handheld device 500 to a known location and pick up where they (or someone else) left off.

In another embodiment, direct entry of position and orientation into the handheld device 500 allows the user to simulate interaction with the target object 110 from a remote location. In this simulation mode there are additional motion control methods. Additionally, instead of a 1:1 mapping of IMU translation and rotation from the physical world to the CAD/3D virtual environment, the handheld device 500 is configured to scale motions to allow a small motion of the handheld device 500 to represent a large motion in the virtual environment, or a large motion of the handheld device 500 can be scaled to small motion in the virtual environment. Therefore, the handheld device 500 can be used to virtually navigate in spaces much smaller, much larger, or different than that of the real world. For example, the handheld device 500 in conjunction with a display can allow an educator to take students on a virtual tour of something as large as the known universe, or as small as atoms, by moving the handheld device 500 during a lecture in a classroom. In this embodiment, the position of the handheld device 500 can be indexed in an equivalent way to how a user picks up a computer mouse once the physical computer mouse reaches the edge of the mouse pad and repositions computer mouse to get more space to continue moving the cursor on the screen. For the handheld device 500, the indexing is in three to six dimensions instead of just two dimensions as is standard with a computer mouse.

Figure 11:
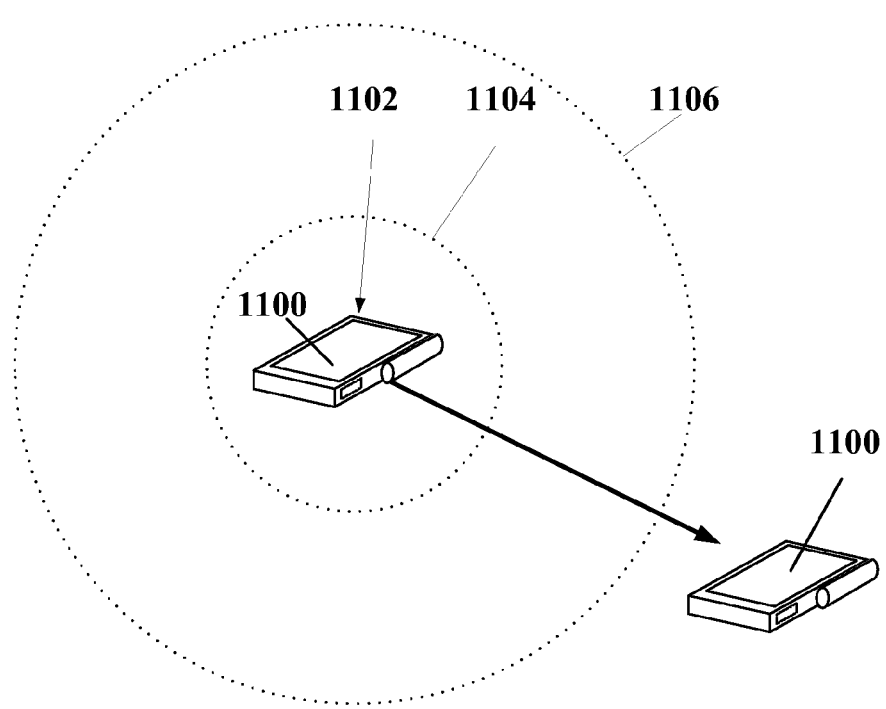
FIG. 11 is a diagram of an illustrative embodiment of a rate control method for determining translation in a virtual environment.

In one embodiment, translation movements in the virtual environment use rate (velocity) control instead of, or in addition to, direct position control. Referring now to FIG. 11, the device 1100 is initially located at an initial position 1102. Any movement of the device 1100 within a first radius 1104 of the initial position 1102 produces direct positioning motion. Any movement of the device 1100 outside of the first radius 1104, but inside of a second radius 1106, causes continuous motion at a constant velocity along a heading away from the initial position 1102 until the user returns the device 1100 to inside of the first radius 1104 or re-indexes the device 1100 to a new initial position (not shown). Moving the device 1100 outside of the second radius 1106 causes acceleration in that direction at an increasingly faster rate.

Figure 12:
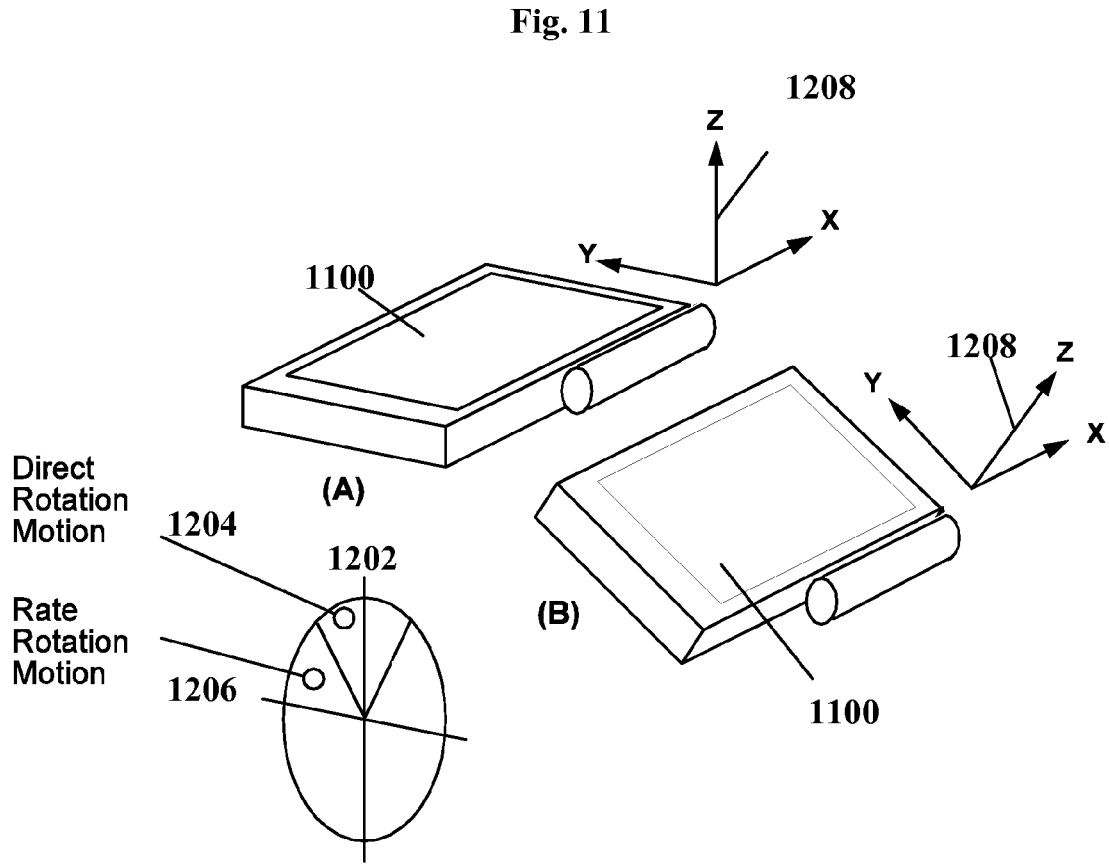
FIG. 12 is a diagram of an illustrative embodiment of a rate control method for determining orientation in a virtual environment.

In another embodiment, orientation changes in the virtual environment use a similar rate control methodology to that described above for translation movements. Referring now to FIG. 12, when the vertical axis (Z) 1208 of the device 1100 moves within the inner wedge region 1204 relative to the initial orientation 1202, motion in the virtual environment is in the direct orientation control mode. When the vertical axis 1208 of the device 1100 is moved further away from the initial orientation 1202 to the outer wedge region 1206 a rate control method is enabled that causes the angle to continue to increase even when the device 1100 is held stationary. To stop the motion, the user returns the vertical axis 1208 of the device 1100 to the inner wedge region 1204 near the initial orientation 1202, or applies indexing.

In both rate control embodiments, rate motion control, which is a measure of translational or rotational velocity, can be used directly by the handheld device 1100 or sent to a remote application for other uses. Similarly, acceleration data can be used directly by the handheld device 1100 or sent to a remote application for other uses.

Various embodiments of the invention shown in the drawings and described above are exemplary of numerous embodiments that may be within the scope of the appended claims. It is contemplated that numerous other configurations of a handheld device capable of determining the position and orientation of the handheld device relative to a known object may be created taking advantage of the disclosed approach. It is the applicant's intention that the scope of the patent issuing herefrom will be limited only by the scope of the appended claims.

What is claimed is:

1. An apparatus for determining spatial position relative to a known object, comprising:
    an actuator for triggering a selection indication when said apparatus is oriented at a point of interest;
    an orientation detector for providing an orientation indication of the apparatus when said selection indication is triggered;
    a processor adapted to calibrate an initial position of the apparatus relative to a known object using a plurality of said orientation indications; and
    an output means for indicating said initial position.

2. The system of claim 1, further comprising a pointing means selected from the group consisting of a mechanical pointing means, a light emitting means, a laser, an optical means, and a digital imaging means.

3. The system of claim 1, wherein said orientation detector is a pointing means in physical communication with a gimbal having a pan angle sensor and a tilt angle sensor.

4. The system of claim 1, further comprising a spatial position detector for providing a plurality of positional movement indications of the apparatus; wherein said processor is further adapted to track a current position of the apparatus using said plurality of positional movement indications; and wherein said output means in adapted to indicate said current position.

5. The system of claim 4, wherein said spatial position detector comprises an inertial measurement unit.

6. The system of claim 5, wherein said inertial measurement unit is selected from the group consisting of a two degree of freedom inertial measurement unit, a three degree of freedom inertial measurement unit, a four degree of freedom inertial measurement unit, a five degree of freedom inertial measurement unit, and a six degree of freedom inertial measurement unit.

7. The system of claim 4, wherein said processor is adapted to calibrate an initial position of the apparatus relative to a known object using a plurality of said orientation indication and said plurality of positional movement indications.

8. The system of claim 1, wherein said apparatus is self-contained and handheld.

9. The system of claim 1, wherein said apparatus is a wireless communications device.

10. A method of determining the spatial position of a point of interest, comprising:
    (a) calibrating a device to determine an initial position of said device relative to a known object, said calibrating further comprising:
        (i) pointing a sighting means of said device at a feature of said known object, said feature having a known location;
        (ii) sensing said orientation of said device during said pointing operation;
        (iii) repeating said steps (i) and (ii) for a plurality of said features; and
        (iv) calculating said initial position of said device relative to said known object using said known location and said orientation of said device for said plurality of features pointed at by said sighting means on said device, and (b) moving said device to a new position;
(c) sensing said moving operation using a sensor in said device; and
(d) calculating said new position of said device using an information from said sensor.

11. The method of claim 10, wherein step (a) further comprises determining an initial orientation of said device relative to said known object; wherein step (b) further comprises orienting said device to a new orientation; wherein step (c) further comprises sensing said orienting operation using said sensor in said device; wherein step (d) further comprises calculating said new orientation of said device using an information from said sensor; and further comprising step (a)(v) calculating said initial orientation of said device relative to said known object using said calculated initial position, said known locations, and said orientation of said device for said plurality of features pointed at by said sighting means on said device.

12. The method of claim 11, wherein step (a)(v) comprises aligning an orientation of one or more axes of said device to said known object.

13. The method of claim 10, wherein said sensor is selected from the group consisting of an inertial navigation system, a two degree of freedom inertial measurement unit, a three degree of freedom inertial measurement unit, a four degree of freedom inertial measurement unit, a five degree of freedom inertial measurement unit, a six degree of freedom inertial measurement unit, and a gimbal having a pan angle sensor and a tilt angle sensor.

14. The method of claim 10, wherein said coordinate system of said known object is different than a coordinate system of said device.

15. The method of claim 10, wherein said step (a)(ii) further comprises sensing a movement of said device between a previous pointing operation and a current pointing operation for each pointing operation, and said step (a)(iv) calculates said initial position of said device relative to said known object using said known location, said orientation of said device for said plurality of features pointed at by said sighting means on said device, and said movement of said device between each said pointing operation.

16. The method of claim 10, further comprising outputting said new position of said device.

17. The method of claim 11, further comprising outputting said new position and said new orientation of said device.

18. The method of claim 11, further comprising displaying an information regarding said known object based at least in part upon said new position and a new orientation of said device.

19. The method of claim 18, wherein said information is retrieved using said new position of said device in the coordinate system of said known object.

20. The method of claim 10, further comprising providing an instruction to guide a user to a location of a point of interest of said known object based at least in part upon said new position.

* * * * *